United States Patent
Lipson et al.

(10) Patent No.: US 11,111,705 B2
(45) Date of Patent: Sep. 7, 2021

(54) LATCH HAVING SHEAR LOAD CARRYING CAPABILITY

(71) Applicant: ROHR, INC., Chula Vista, CA (US)

(72) Inventors: David Louis Lipson, Chula Vista, CA (US); Paul F McMahan, College Station, TX (US)

(73) Assignee: Rohr, Inc., Chula Vista, CA (US)

(*) Notice: Subject to any disclaimer, the term of this patent is extended or adjusted under 35 U.S.C. 154(b) by 430 days.

(21) Appl. No.: 16/223,995

(22) Filed: Dec. 18, 2018

(65) Prior Publication Data

US 2020/0190876 A1    Jun. 18, 2020

(51) Int. Cl.
*E05C 19/14* (2006.01)
*B64D 29/06* (2006.01)

(52) U.S. Cl.
CPC ............ *E05C 19/145* (2013.01); *B64D 29/06* (2013.01)

(58) Field of Classification Search
CPC ......... Y10T 292/0917; Y10T 292/0936; Y10T 292/0949; Y10T 292/1062; Y10T 292/108; Y10T 292/20; Y10T 292/202; Y10T 292/224; Y10T 292/564; Y10T 292/223; E05C 19/145; E05C 19/14; E05C 19/12; E05C 19/10; E05C 3/04; E05C 3/06; E05C 3/08; B64D 29/06; E05B 65/0811; E05B 65/0817; E05B 65/006; E05B 15/0086; E05B 5/00
USPC ........................................................ 292/113
See application file for complete search history.

(56) References Cited

U.S. PATENT DOCUMENTS

| | | | | |
|---|---|---|---|---|
| 673,183 A * | 4/1901 | Walsh | ................. | E05B 65/0811 292/128 |
| 1,959,361 A * | 5/1934 | Holtzman | ............... | E05B 63/12 70/105 |
| 2,621,952 A * | 12/1952 | Gander | .................... | E05C 3/122 292/196 |
| 2,832,446 A * | 4/1958 | Smith | ..................... | E05C 3/122 403/321 |
| 3,047,321 A * | 7/1962 | Gander | .................... | E05C 3/122 292/223 |
| 4,158,463 A * | 6/1979 | Henrichs | ............... | E05B 15/025 292/341.18 |
| 4,307,905 A * | 12/1981 | Poe | ........................ | E05B 65/006 292/200 |
| 4,365,831 A * | 12/1982 | Bourne | ................... | E05C 3/122 292/210 |
| 4,538,843 A | 9/1985 | Harris | | |

(Continued)

FOREIGN PATENT DOCUMENTS

| CN | 112049526 A * | 12/2020 | ............... B64C 1/00 |
|---|---|---|---|
| GB | 2264530 A * | 9/1993 | ............... E05B 7/00 |

(Continued)

OTHER PUBLICATIONS

European Patent Office, European Search Report dated Apr. 9, 2020 in Application No. 19217711.1.

*Primary Examiner* — Kristina R Fulton
*Assistant Examiner* — Steven A Tullia
(74) *Attorney, Agent, or Firm* — Snell & Wilmer L.L.P.

(57) ABSTRACT

A latch arrangement may comprise a latch bolt configured to rotate about a pivot, and a shear pin coupled to the latch bolt. A counterbore may receive the shear pin whereby lateral loads may be transferred between a door panel and a frame.

20 Claims, 6 Drawing Sheets

(56) References Cited

U.S. PATENT DOCUMENTS

| | | | | |
|---|---|---|---|---|
| 4,548,434 A | * | 10/1985 | Princell | B60J 7/19 292/223 |
| 4,679,833 A | * | 7/1987 | Dueringer | E05B 65/52 292/113 |
| 4,693,503 A | * | 9/1987 | Bisbing | E05C 3/08 292/210 |
| 4,906,036 A | * | 3/1990 | James | E05B 63/0056 292/202 |
| 4,925,221 A | | 5/1990 | Carmody et al. | |
| 4,928,615 A | * | 5/1990 | Williams | E05C 9/06 114/201 R |
| 5,556,142 A | | 9/1996 | Zankich | |
| 5,638,709 A | * | 6/1997 | Clavin | E05B 13/002 292/229 |
| 6,408,659 B1 | * | 6/2002 | Chang | E05C 19/007 70/19 |
| 6,606,889 B1 | * | 8/2003 | Tweedy | E05B 13/002 292/DIG. 31 |
| 6,969,824 B2 | * | 11/2005 | Silvestro | B23K 9/32 219/133 |
| 7,448,656 B1 | | 11/2008 | Hein et al. | |
| 8,419,088 B2 | * | 4/2013 | Baic | E05C 3/06 292/194 |
| 8,857,230 B1 | * | 10/2014 | Misner | E05B 13/10 70/208 |
| 9,140,041 B2 | | 9/2015 | Wollacott | |
| 2004/0012208 A1 | * | 1/2004 | Ruiz | E05B 65/006 292/64 |
| 2013/0328331 A1 | * | 12/2013 | Wollacott | E05B 17/0025 292/202 |
| 2017/0356223 A1 | * | 12/2017 | Do | E05B 41/00 |

FOREIGN PATENT DOCUMENTS

| | | | | |
|---|---|---|---|---|
| GB | 2513883 A | * | 11/2014 | ............ E05C 3/08 |
| JP | 08284491 A | * | 10/1996 | ......... E05B 1/0092 |
| WO | 2010094892 | | 8/2010 | |
| WO | 2015126950 | | 8/2015 | |
| WO | 2016044385 | | 3/2016 | |

* cited by examiner

LATCH HAVING SHEAR LOAD CARRYING CAPABILITY

FIELD

The present disclosure relates to latches and more particularly to a latch for securing aircraft hinged access and pressure relief doors.

BACKGROUND

Modern aircraft are equipped with a large number of external access panels and pressure relief doors that are flush mounted so as to provide an aerodynamic, low drag surface when airborne. These external access panels and non-access panels for some pressure relief door applications conventionally allow access to, for example, hydraulic, electronic, and engine systems, among others. In order to maintain a panel in the closed position, and in some applications while still providing quick access to the area behind the panel while the aircraft is parked on the ground, low-profile flush mounted latches typically are incorporated into the design of the panel for securing the panel to the aircraft frame.

SUMMARY

A latch arrangement is disclosed, comprising a latch bolt configured to rotate about a pivot, a contacting member extending from the latch bolt, the contacting member comprising a first contacting surface, a shear pin extending from the first contacting surface, a striker plate comprising a second contacting surface, and a counterbore disposed in the second contacting surface, wherein the counterbore is configured to receive the shear pin.

In various embodiments, the shear pin and the counterbore are configured to transfer a lateral load between the contacting member and the striker plate.

In various embodiments, the first contacting surface of the contacting member is configured to contact the second contacting surface of the striker plate.

In various embodiments, the first contacting surface and the second contacting surface are configured to transfer a longitudinal load between the contacting member and the striker plate.

In various embodiments, the latch arrangement further comprises a handle operably coupled to the latch bolt.

In various embodiments, the latch arrangement further comprises a spring configured to bias the latch bolt in a rotational direction about the pivot.

In various embodiments, the contacting member comprises an adjustable threaded stud coupled to the latch bolt.

In various embodiments, a geometry of the counterbore is complimentary to that of the shear pin.

A door panel arrangement is disclosed, comprising a frame, a door panel pivotally coupled to the frame, and a latch arrangement. The latch arrangement comprises a latch bolt pivotally coupled to the door panel, a contacting member extending from the latch bolt, the contacting member comprising a first contacting surface, a shear pin extending from the first contacting surface, a striker plate coupled to the frame, the striker plate comprising a second contacting surface, and a counterbore disposed in the second contacting surface, wherein the counterbore is configured to receive the shear pin.

In various embodiments, the shear pin and the counterbore are configured to transfer a lateral load between the contacting member and the striker plate.

In various embodiments, the first contacting surface of the contacting member is configured to contact the second contacting surface of the striker plate.

In various embodiments, the first contacting surface and the second contacting surface are configured to transfer a longitudinal load between the contacting member and the striker plate.

In various embodiments, the latch bolt is coupled to an interior surface of the door panel.

In various embodiments, the door panel arrangement further comprises a landing coupled to the frame, wherein the door contacts the landing in the closed position.

In various embodiments, the landing is disposed between the door panel and the latch bolt.

In various embodiments, the door panel arrangement further comprises a handle operably coupled to the latch bolt.

In various embodiments, the door panel arrangement further comprises a spring configured to bias the latch bolt in a rotational direction about a pivot.

In various embodiments, the contacting member comprises an adjustable threaded stud coupled to the latch bolt.

In various embodiments, a geometry of the counterbore is complimentary to that of the shear pin.

In various embodiments, the latch bolt rotates in a first rotational direction towards an unlocked position and the door panel rotates in a second rotational direction towards an open position.

A shear load carrying method is disclosed, comprising rotating a latch bolt about a pivot, receiving, by a counterbore disposed in a striker plate, a shear pin in response to the latch bolt rotating about the pivot, and transferring a shear load between the shear pin and the striker plate.

In various embodiments, the method further comprises contacting, by a contacting surface of the latch bolt, a contacting surface of the striker plate, wherein the shear pin extends from the contacting surface of the latch bolt.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, material, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

Door panels may be mounted to a structure which carries loads that cause the door panel to move with respect to the structure. These loads may be high frequency (e.g., vibratory) or low frequency loads. In particular, shear (lateral) loading may be transferred between the door panel and the structure which may cause the door panel to move generally along the plane of the door panel with respect to the structure. Shear loading may cause undesirable wear and/or loading on the door panel latch and/or the door panel hinge(s). Shear loading may cause undesirable wear between the door panel latch and the mating surface.

The latch arrangement, as disclosed herein, may comprise a shear feature which minimizes door panel movement with respect to the structure to which the door panel is mounted. The latch arrangement, as disclosed herein, may minimize undesirable wear and/or loading on the door panel latch(es) and/or door panel hinge(s). The latch arrangement, as disclosed herein, may tend to minimize wear between the door panel latch and the mating surface.

In various embodiments, a latch arrangement as disclosed herein may be particularly useful for turbine engine nacelle access panels (e.g., fan cowl access panels). However, it is contemplated that the latch arrangement may be suitable for any door panel where minimization of in-plane movement of the door panel with respect to the mounting structure is desired, including door panels for air vehicles, land vehicles, water vehicles, space vehicles, and industrial machinery, among others. The latch arrangement if the present disclosure may be particularly useful for vibratory environments.

In various embodiments, a latch arrangement as disclosed herein may be particularly useful for latches attached to the interior of a panel door, where an aerodynamic, or otherwise smooth, surface is desired at the exterior of the panel door. Stated differently, a latch arrangement of the present disclosure may be disposed entirely inward from, or flush with, the exterior surface of the panel door.

A latch arrangement may comprise a latch bolt and a striker plate, wherein the latch bolt is actuated by a latch handle located on an outer surface (e.g., a flow surface) of the door panel. Accordingly, in response to the handle being operated, the latch bolt disengages from the striker plate, allowing access to the interior of the door panel.

Figure 1:
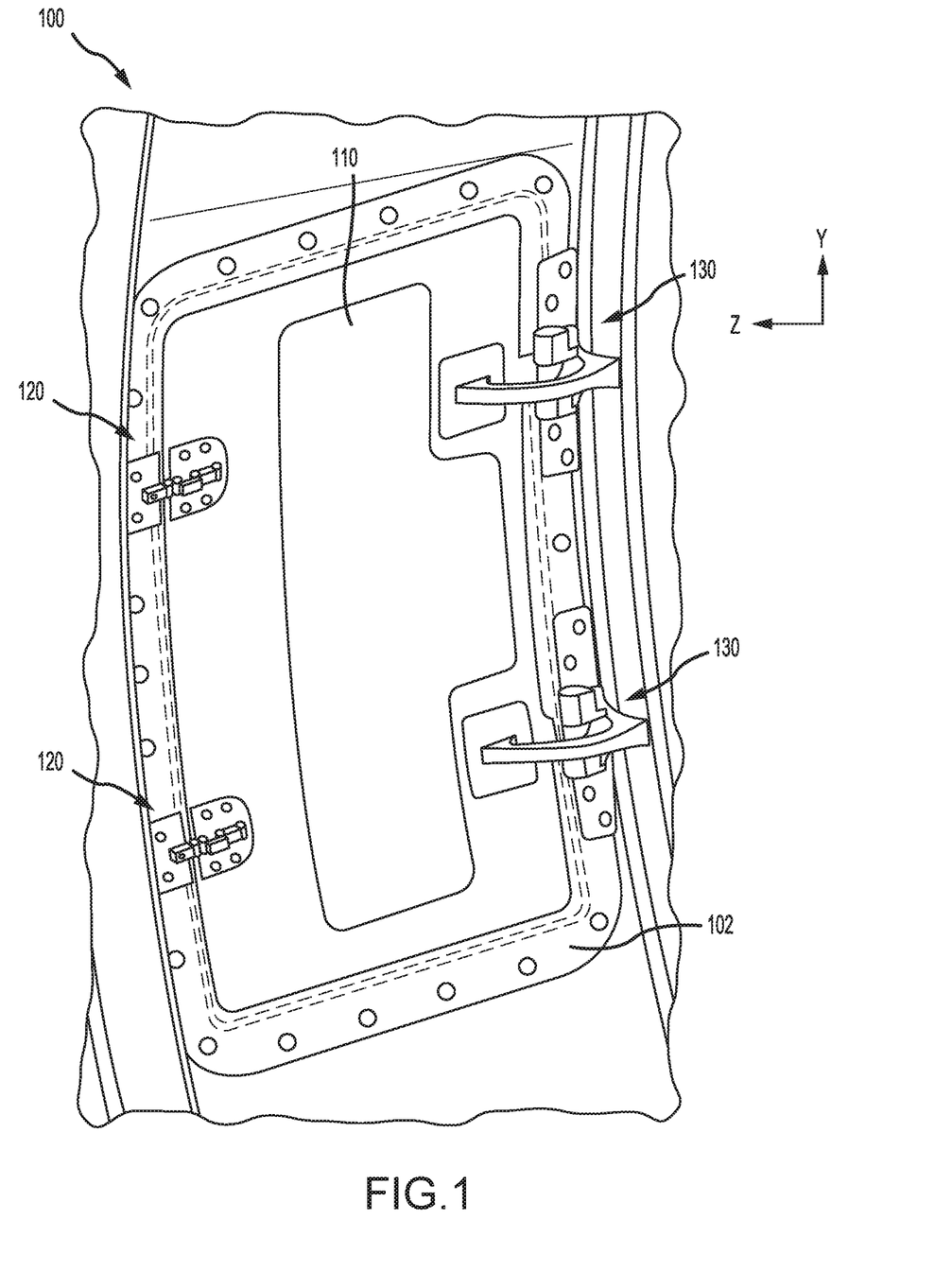
FIG. 1 illustrates an inward view of a door panel arrangement in a closed position, in accordance with various embodiments.

With reference to FIG. 1, an inward view of a door panel arrangement 100 in a closed position is illustrated, in accordance with various embodiments. Door panel arrangement 100 may include a door panel 110 and at least one latch arrangement 120. Door panel arrangement 100 may include a frame 102 to which door panel 110 is mounted. Door panel arrangement 100 may include at least one hinge 130 by which door panel 110 is mounted to frame 102. Door panel 110 may be configured to rotate outward in a first rotational direction to an open position and rotate inward in a second rotational direction to a closed position as illustrated in FIG. 1. Door panel 110 may rotate about hinge 130. Latch arrangement 120 may secure door panel 110 in the closed position and may be actuated between a locked position and an unlocked position.

Figure 2A:
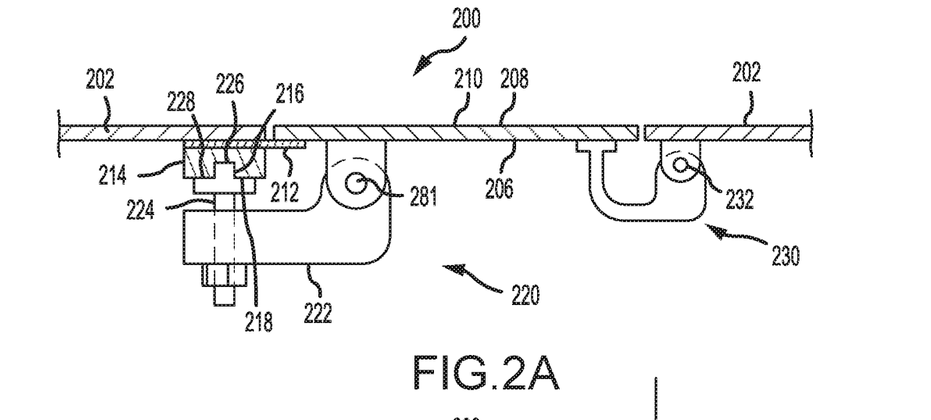
FIG. 2A illustrates a section view of a door panel arrangement with a door panel in the closed position and a latch arrangement having a shear pin received by a counterbore in a locked position, in accordance with various embodiments.

With reference to FIG. 2A, a section view of a door panel arrangement 200, is illustrated in accordance with various embodiments. Door panel arrangement 200 may include a door panel 210 and a latch arrangement 220. The illustrated embodiment shows door panel 210 in a closed position and latch arrangement 220 in a locked position. Door panel 210 is pivotally coupled to frame 202 via a hinge 230. Door panel 210 may rotate about a pivot 232 of hinge 230. In the locked position, latch arrangement 220 secures door panel 210 in the closed position with respect to frame 202. In the closed position, door panel 210 may rest against a landing plate 212. In various embodiments, latch arrangement 220 secures door panel 210 in compression against landing plate 212. In the closed position, door panel 210 may be flush with frame 202.

Door panel 210 may comprise an inner surface 206 and an outer surface 208. Latch arrangement 220 may include a latch bolt 222 pivotally coupled to the inner surface 206 of door panel 210. Latch bolt 222 may rotate about a pivot 281. Latch arrangement 220 may comprise a contacting member 224 extending from latch bolt 222. In various embodiments, contacting member 224 and latch bolt 222 are two separate pieces. In various embodiments, contacting member 224 and latch bolt 222 comprise a single, monolithic piece. Contacting member 224 may comprise a contacting surface (also referred to herein as a first contacting surface) 228 and a pin (also referred to herein as a shear pin) 226 extending from the contacting surface 228.

Contacting member 224 may be configured to contact a striker plate 214 via contacting surface 228 and pin 226. Striker plate 214 may comprise a contacting surface (also referred to herein as a second contacting surface) 218 and a counterbore 216 disposed in the contacting surface 218. In various embodiments, striker plate 214 and landing plate 212 are two separate pieces. In various embodiments, striker plate 214 and landing plate 212 comprise a single, monolithic piece. In various embodiments, landing plate 212 is coupled between striker plate 214 and frame 202. In various embodiments, landing plate 212 is coupled between latch bolt 222 and door panel 210 in response to door panel 210 being in the closed position. In response to door panel 210 moving to the closed position, as illustrated in FIG. 2A, contacting surface 228 of contacting member 224 may contact contacting surface 218 of striker plate 214 and counterbore 216 may receive pin 226. Stated differently, pin 226 may extend into counterbore 216. Longitudinal loads may be transferred between contacting surface 218 and contacting surface 228.

Figure 2B:
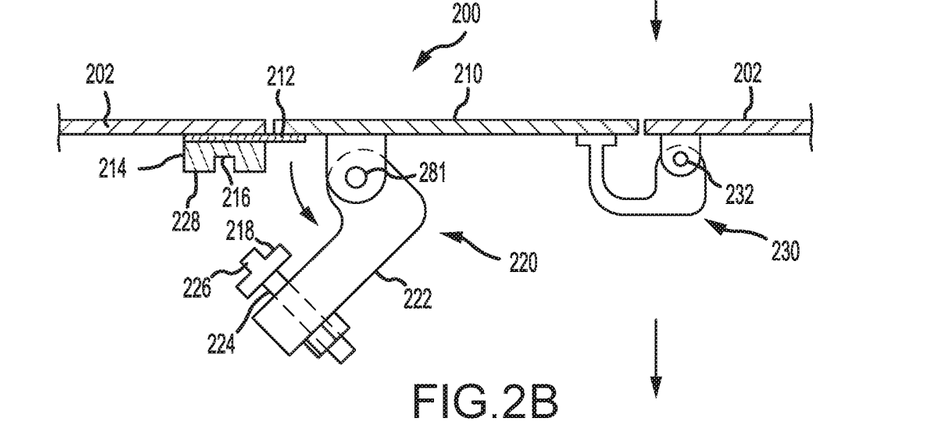
FIG. 2B illustrates a section view of a door panel arrangement with a door panel in the closed position and a latch arrangement in an unlocked position, in accordance with various embodiments.

With reference to FIG. 2B, door panel arrangement 200 is illustrated with latch arrangement 220 in an unlocked position with latch bolt 222 rotated about pivot 281 away from striker plate 214. With latch arrangement 220 in the unlocked position and rotated away from striker plate 214, door panel 210 is free to rotate to an open position. In various embodiments, latch bolt 222 rotates in a first rotational direction (i.e., counterclockwise in FIG. 2B) about pivot 281 to allow door panel 210 to rotate towards an open position.

Figure 2C:
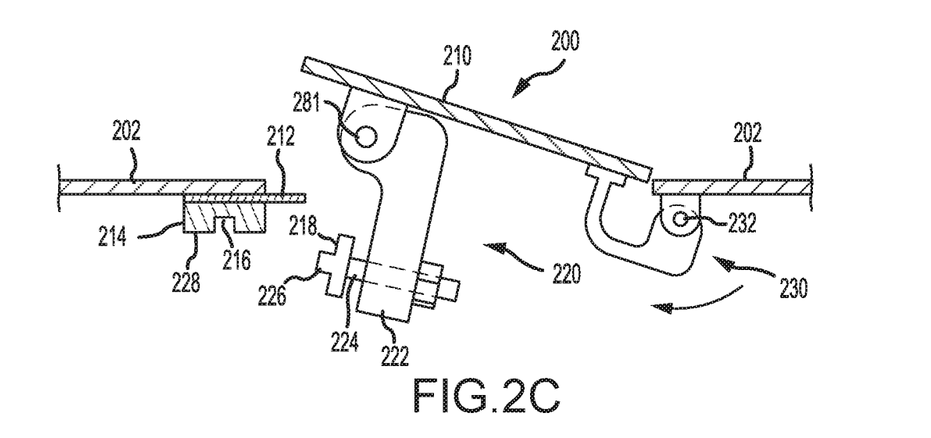
FIG. 2C illustrates a section view of a door panel arrangement with a door panel rotating towards an open position and the latch arrangement in the unlocked position, in accordance with various embodiments.

With reference to FIG. 2C, door panel arrangement 200 is illustrated with door panel 210 rotated towards an open position. Door panel arrangement 200 may rotate about pivot 232 towards the open position. In various embodiments, door panel 210 rotates in a second rotational direction (i.e., clockwise in FIG. 2C) about pivot 232 towards the open position.

In this regard, latch arrangement 220 of the present disclosure includes pin 226 extending from contacting surface 218 of latch bolt 222, wherein the pin 226 is received by counterbore 216 disposed in contacting surface 228 in response to latch arrangement 220 moving to a locked position (see FIG. 2A). Pin 226 may engage counterbore 216 to minimize in-plane movement of door panel 210 with respect to frame 202. In this regard, shear forces may be transmitted between striker plate 214 and pin 226. Stated differently, a lateral load may be transmitted between the striker plate 214 and pin 226. In various embodiments, contacting surface 228 and inner surface 206 face the same direction in response to door panel 210 being in the closed position.

Figure 3A:
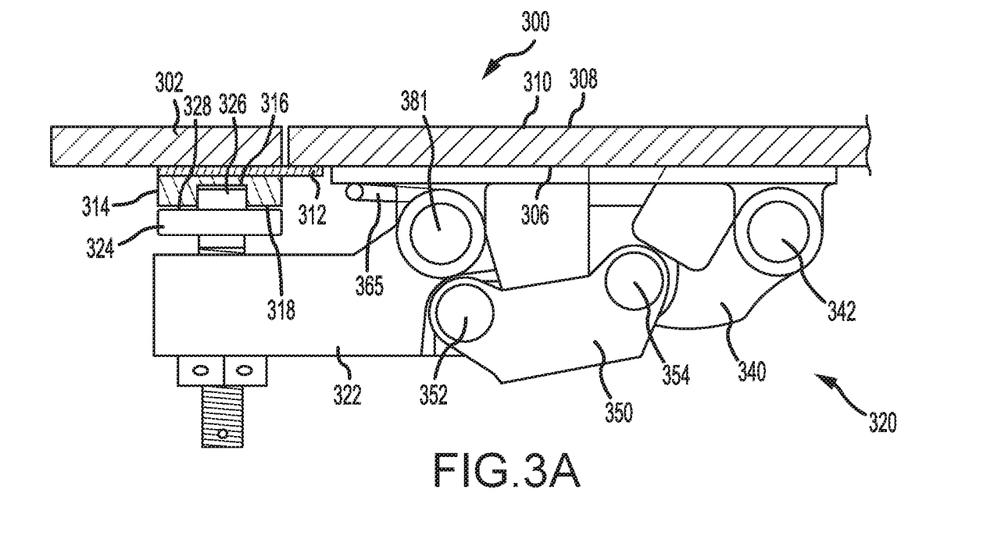
FIG. 3A illustrates a section view of an over-centering latch arrangement having a shear pin received by a counterbore in a locked position, in accordance with various embodiments.

With reference to FIG. 3A, a section view of a door panel arrangement 300 including an over-center latch arrangement (latch arrangement) 320, is illustrated in accordance with various embodiments. Door panel arrangement 300 may be similar to door panel arrangement 200 of FIG. 2A. Door panel arrangement 300 may include a door panel 310 and latch arrangement 320. The illustrated embodiment shows door panel 310 in a closed position and latch arrangement 320 in a locked position. Door panel 310 may be pivotally coupled to frame 302 via a hinge, similar to door panel 210 of FIG. 2A. In the locked position, latch arrangement 320 secures door panel 310 in the closed position with respect to frame 302. In the closed position, door panel 310 may rest against a landing plate 312. In various embodiments, latch arrangement 320 secures door panel 310 in compression against landing plate 312. In this regard, a pre-load may be applied between landing plate 312 and inner surface 306 of door panel 310 in response to latch assembly being moved to the locked position. In the closed position, door panel 310 may be flush with frame 302.

Door panel 310 may comprise an inner surface 306 and an outer surface 308. Latch arrangement 320 may include a latch bolt 322 pivotally coupled to the inner surface 306 of door panel 310. Latch bolt 322 may rotate about a pivot 381. Latch arrangement 320 may comprise a contacting member 324 extending from latch bolt 322. In various embodiments, contacting member 324 and latch bolt 322 are two separate pieces. In various embodiments, contacting member 324 and latch bolt 322 comprise a single, monolithic component. Contacting member 324 may comprise a contacting surface (also referred to herein as a first contacting surface) 328 and a pin (also referred to herein as a shear pin) 326 extending from the contacting surface 328.

Contacting member 324 may be configured to contact a striker plate 314 via contacting surface 328 and pin 326. Striker plate 314 may comprise a contacting surface (also referred to herein as a second contacting surface) 318 and a counterbore 316 disposed in the contacting surface 318. In various embodiments, striker plate 314 and landing plate 312 are two separate pieces. In various embodiments, striker plate 314 and landing plate 312 comprise a single, monolithic component. In various embodiments, landing plate 312 is coupled between striker plate 314 and frame 302. In various embodiments, landing plate 312 is coupled between latch bolt 322 and door panel 310 in response to door panel 310 being in the closed position. In response to door panel 310 moving to the closed position, as illustrated in FIG. 3A, contacting surface 328 of contacting member 324 may contact contacting surface 318 of striker plate 314 and counterbore 316 may receive pin 326. Stated differently, pin 326 may extend into counterbore 316.

Latch bolt 322 may be operably coupled to a handle 340. Handle 340 may be pivotally coupled to door panel 310. Handle 340 may be pivotally coupled to door panel 310 via a pivot 342. Handle 340 may rotate about pivot 342. A link 350 may be pivotally coupled between latch bolt 322 and handle 340. Link 350 and latch bolt 322 may be pivotally coupled by a pivot 352 whereby link 350 and latch bolt 322 are free to rotate with respect to each other. Link 350 and handle 340 may be pivotally coupled by a pivot 354 whereby link 350 and handle 340 are free to rotate with respect to each other.

In the locked position, handle 340 may be in an over-center position and link 350 may transmit a force into latch bolt 322 to hold latch bolt 322 in compression against striker plate 314. Latch bolt 322 may be released from striker plate 314 by prying an end 344 of handle 340 (e.g., via a tool or by hand) to rotate handle 340 about pivot 342 in a second rotational direction (see FIG. 3B). Latch bolt 322 may rotate in a first rotational direction about pivot 381, via link 350, in response to handle 340 being rotated in the second rotational direction. The first rotational direction may be opposite the second rotational direction. In various embodiments, a spring 365 may bias latch bolt 322 to rotate in the first rotational direction.

Figure 3B:
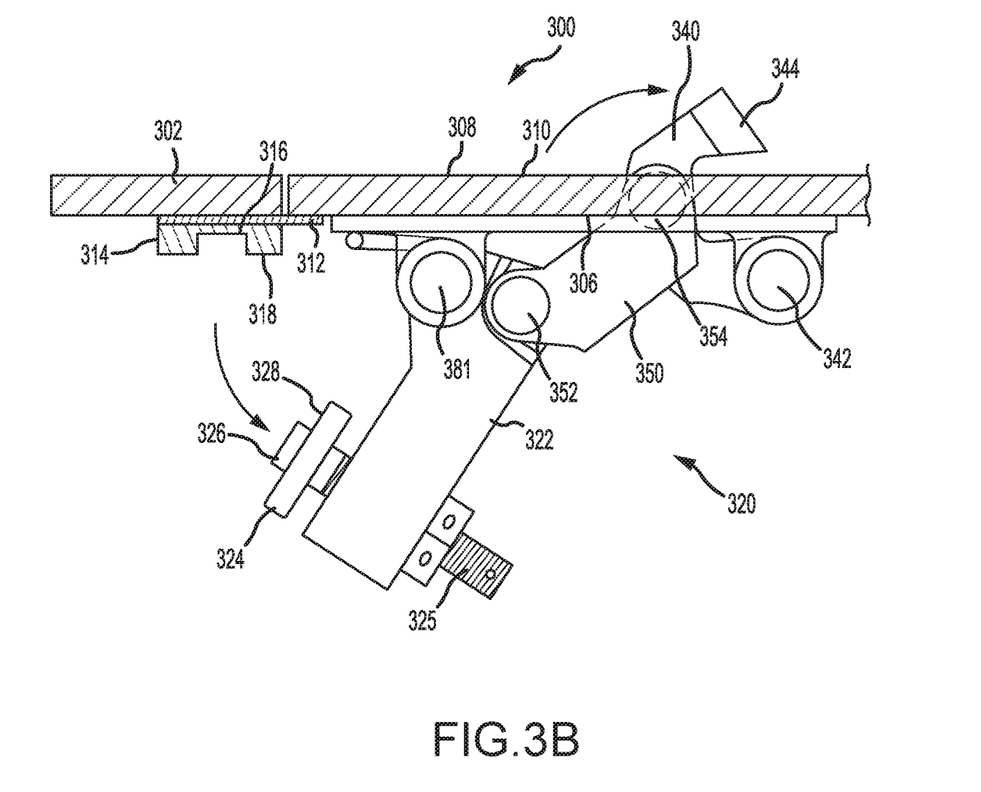
FIG. 3B illustrates a section view of the over-centering latch arrangement in an unlocked position, in accordance with various embodiments.

With reference to FIG. 3B, door panel arrangement 300 is illustrated with latch arrangement 320 in an unlocked position with latch bolt 322 rotated about pivot 381 away from striker plate 314. With latch arrangement 320 in the unlocked position and rotated away from striker plate 314, door panel 310 is free to rotate to an open position. In various embodiments, latch bolt 322 rotates in a first rotational direction (i.e., counterclockwise in FIG. 3B) about pivot 381 to allow door panel 310 to rotate towards an open position. In various embodiments, door panel 310 rotates in a second rotational direction (i.e., clockwise in FIG. 3B) towards the open position.

In various embodiments, contacting member 324 may comprise an adjustable threaded stud 325 rotatably coupled to latch bolt 322 whereby the position of contacting surface 328 relative to latch bolt 322 may be adjusted. In this manner, a pre-load of the latch bolt 322 against striker plate 314 may be adjusted. In various embodiments, latch bolt 322 is pre-loaded in response to the latch bolt 322 moving to the locked position. In various embodiments, latch bolt 322 is not pre-loaded in response to the latch bolt 322 moving to the locked position.

Figure 4A:
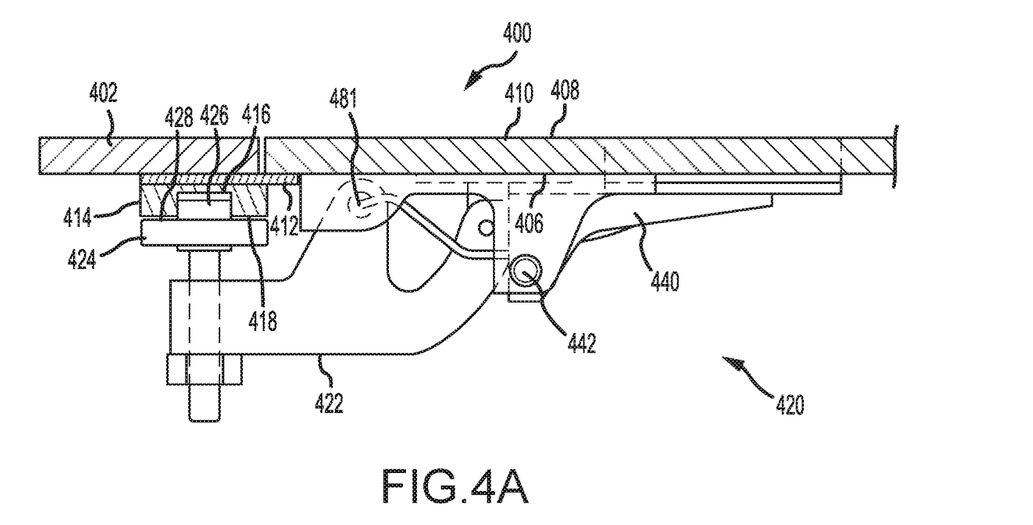
FIG. 4A illustrates a section view of a non-over-centering latch arrangement having a pin received by a counterbore in a locked position, in accordance with various embodiments.

With reference to FIG. 4A, a section view of a door panel arrangement 400 including a non-over-centering latch arrangement (latch arrangement) 420, is illustrated in accordance with various embodiments. Door panel arrangement 400 may be similar to door panel arrangement 200 of FIG. 2A. Door panel arrangement 400 may include a door panel 410 and latch arrangement 420. The illustrated embodiment shows door panel 410 in a closed position and latch arrangement 420 in a locked position. Door panel 410 may be pivotally coupled to frame 402 via a hinge, similar to door panel 210 of FIG. 2A. In the locked position, latch arrangement 420 secures door panel 410 in the closed position with respect to frame 402. In the closed position, door panel 410 may rest against a landing plate 412. In various embodiments, latch arrangement 420 secures door panel 410 in compression against landing plate 412. In this regard, a pre-load may be applied between landing plate 412 and inner surface 406 of door panel 410 in response to latch assembly being moved to the locked position. However, latch arrangement 420 may merely secure door panel 410 relative to landing plate 412 without a pre-load. In the closed position, door panel 410 may be flush with frame 402.

Door panel 410 may comprise an inner surface 406 and an outer surface 408. Latch arrangement 420 may include a latch bolt 422 pivotally coupled to the inner surface 406 of door panel 410. Latch bolt 422 may rotate about a pivot 481. Latch arrangement 420 may comprise a contacting member 424 extending from latch bolt 422. In various embodiments, contacting member 424 and latch bolt 422 are two separate pieces. In various embodiments, contacting member 424 and latch bolt 422 comprise a single, monolithic component. Contacting member 424 may comprise a contacting surface (also referred to herein as a first contacting surface) 428 and a pin (also referred to herein as a shear pin) 426 extending from the contacting surface 428.

Contacting member 424 may be configured to contact a striker plate 414 via contacting surface 428 and pin 426. Striker plate 414 may comprise a contacting surface (also referred to herein as a second contacting surface) 418 and a counterbore 416 disposed in the contacting surface 418. In various embodiments, striker plate 414 and landing plate 412 are two separate pieces. In various embodiments, striker plate 414 and landing plate 412 comprise a single, monolithic piece. In various embodiments, landing plate 412 is coupled between striker plate 414 and frame 402. In various embodiments, landing plate 412 is coupled between latch bolt 422 and door panel 410 in response to door panel 410 being in the closed position. In response to door panel 410 moving to the closed position, as illustrated in FIG. 4A, contacting surface 428 of contacting member 424 may contact contacting surface 418 of striker plate 414 and counterbore 416 may receive pin 426. Stated differently, pin 426 may extend into counterbore 416.

Latch bolt 422 may be operably coupled to a handle 440. Handle 440 may be pivotally coupled to door panel 410. Handle 440 may be pivotally coupled to door panel 410 via a pivot 442. Handle 440 may rotate about pivot 442. In the locked position, handle 440 may engage latch bolt 422 to prevent latch bolt 422 from rotating about pivot 481 (in the counterclockwise direction in FIG. 4A) away from striker plate 414.

Figure 4B:
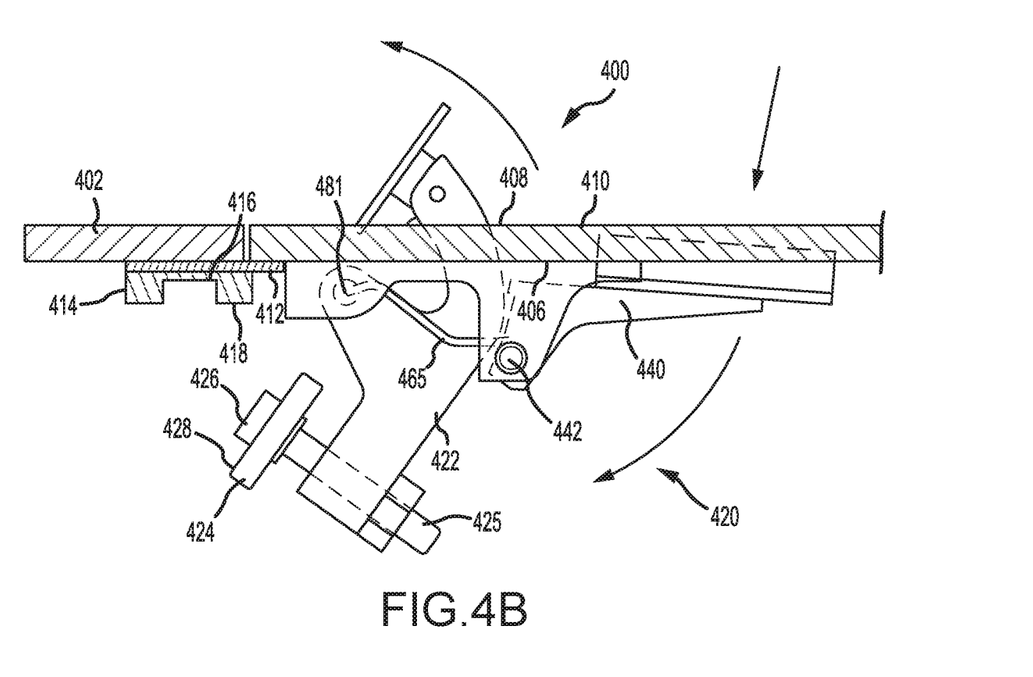
FIG. 4B illustrates a section view of the non-over-centering latch arrangement in an unlocked position, in accordance with various embodiments.

With reference to FIG. 4B, handle 440 may be rotated (e.g., by hand or using a tool) about pivot 442 (in the clockwise direction in FIG. 4B). Handle 440 may disengage latch bolt 422 in response to being rotated about pivot 442, thereby allowing latch bolt 422 to freely rotate about pivot 481. In various embodiments, handle 440 is rotated in a second rotational direction. Latch bolt 422 may rotate in a first rotational direction about pivot 481 in response to handle 440 being rotated in the second rotational direction. The first rotational direction may be opposite the second rotational direction. In various embodiments, a spring 465 may bias latch bolt 422 to rotate in the first rotational direction.

FIG. 4B illustrates door panel arrangement 400 with latch arrangement 420 in an unlocked position with latch bolt 422 rotated about pivot 481 away from striker plate 414. With latch arrangement 420 in the unlocked position and rotated away from striker plate 414, door panel 410 is free to rotate to an open position. In various embodiments, latch bolt 422 rotates in the first rotational direction (i.e., counterclockwise in FIG. 4B) about pivot 481 to allow door panel 410 to rotate towards an open position. In various embodiments, door panel 410 rotates in the second rotational direction (i.e., clockwise in FIG. 4B) towards the open position.

In various embodiments, contacting member 424 may comprise an adjustable threaded stud 425 rotatably coupled to latch bolt 422 whereby the position of contacting surface 428 relative to latch bolt 422 may be adjusted. In this manner, a pre-load of the latch bolt 422 against striker plate 414 may be adjusted. In various embodiments, latch bolt 422 is pre-loaded in response to the latch bolt 422 moving to the locked position. In various embodiments, latch bolt 422 is not pre-loaded in response to the latch bolt 422 moving to the locked position.

Figure 5:
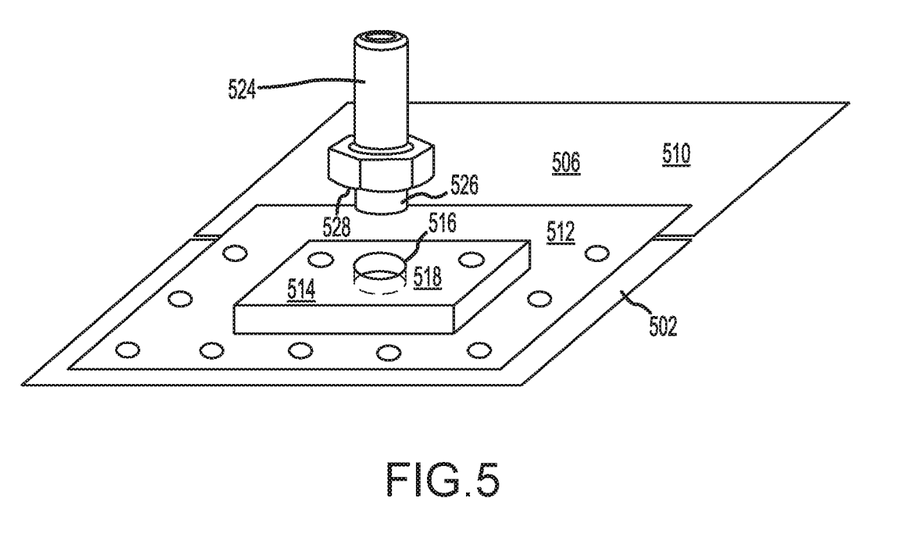
FIG. 5 illustrates an isolated, perspective view of a contacting member with respect to an associated striker plate, in accordance with various embodiments.

With reference to FIG. 5, an isolated, perspective view of an adjustable threaded contacting member 524 with respect to an associated striker plate 514, landing plate 512, and door panel 510, is illustrated, in accordance with various embodiments. Adjustable threaded contacting member 524 may comprise a contacting surface (also referred to herein as a first contacting surface) 528 and a pin (also referred to herein as a shear pin) 526 extending from the contacting surface 528.

Adjustable threaded contacting member 524 may be configured to contact a striker plate 514 via contacting surface 528 and pin 526. Striker plate 514 may comprise a contacting surface (also referred to herein as a second contacting surface) 518 and a counterbore 516 disposed in the contacting surface 518. In various embodiments, striker plate 514 and landing plate 512 are two separate pieces. In various embodiments, striker plate 514 and landing plate 512 comprise a single, monolithic piece. In various embodiments, landing plate 512 is coupled between striker plate 514 and frame 502. In various embodiments, the geometry of counterbore 516 is complimentary to the geometry of pin 526.

Figure 6:
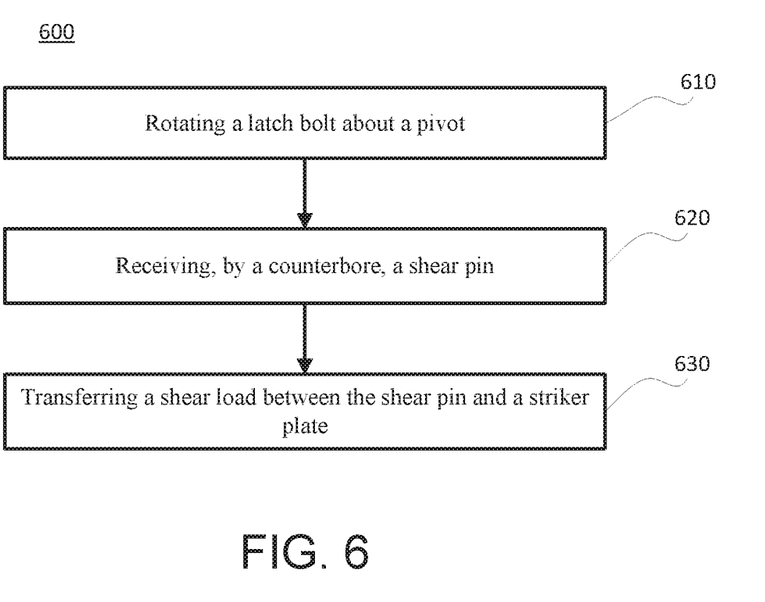
FIG. 6 illustrates a method for shear load carrying, in accordance with various embodiments.

With reference to FIG. 6, a method 600 for shear load carrying is illustrated, in accordance with various embodiments Method 600 includes rotating a latch bolt about a pivot (step 610). Method 600 includes receiving, by a counterbore, a shear pin (step 620). Method 600 includes transferring a shear load between the shear pin and a striker plate (step 630).

With combined reference to FIG. 2A and FIG. 6, step 610 may include rotating latch bolt 222 about pivot 281 in the first rotational direction. Step 620 may include receiving, by counterbore 216, pin 226 in response to latch bolt 222 rotating about pivot 281 in the first rotational direction. Step 630 may include transferring a lateral load—or lateral force—between pin 226 and striker plate 214. In various embodiments, the lateral load may be generated in response to door panel 210 moving laterally (i.e., in the plane of door panel 210) with respect to frame 202.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A latch arrangement, comprising:
   a latch bolt configured to rotate about a pivot;
   a contacting member extending from the latch bolt, the contacting member comprising a first contacting surface;
   a shear pin extending from the first contacting surface;
   a striker plate comprising a second contacting surface; and
   a counterbore disposed in the second contacting surface;
   wherein the counterbore is configured to receive the shear pin;
   wherein the shear pin extends from the first contacting surface at a location of the first contacting surface that is configured to contact the second contacting surface of the striker plate.

2. The latch arrangement of claim 1, wherein the shear pin and the counterbore are configured to transfer a lateral load between the contacting member and the striker plate.

3. The latch arrangement of claim 2, wherein the first contacting surface of the contacting member is configured to contact the second contacting surface of the striker plate, and the first contacting surface and the second contacting surface are configured to transfer a longitudinal load between the contacting member and the striker plate.

4. The latch arrangement of claim 1, further comprising a handle operably coupled to the latch bolt.

5. The latch arrangement of claim 1, further comprising a spring configured to bias the latch bolt in a rotational direction about the pivot.

6. The latch arrangement of claim 1, wherein the contacting member comprises an adjustable threaded stud coupled to the latch bolt.

7. The latch arrangement of claim 1, wherein a geometry of the counterbore is complimentary to that of the shear pin.

8. A door panel arrangement, comprising:
   a frame;
   a door panel pivotally coupled to the frame; and
   a latch arrangement, comprising:
     a latch bolt pivotally coupled to the door panel;
     a contacting member extending from the latch bolt, the contacting member comprising a first contacting surface;
     a shear pin extending from the first contacting surface;
     a striker plate coupled to the frame, the striker plate comprising a second contacting surface; and
     a counterbore disposed in the second contacting surface;
     wherein the counterbore is configured to receive the shear pin;
     wherein the shear pin extends from the first contacting surface at a location of the first contacting surface that is configured to contact the second contacting surface of the striker plate.

9. The door panel arrangement of claim 8, wherein the shear pin and the counterbore are configured to transfer a lateral load between the contacting member and the striker plate.

10. The door panel arrangement of claim 9, wherein the first contacting surface of the contacting member is configured to contact the second contacting surface of the striker plate, and the first contacting surface and the second contacting surface are configured to transfer a longitudinal load between the contacting member and the striker plate.

11. The door panel arrangement of claim 8, wherein the latch bolt is coupled to an interior surface of the door panel.

12. The door panel arrangement of claim 8, further comprising a landing coupled to the frame, wherein the door contacts the landing in a closed position.

13. The door panel arrangement of claim 12, wherein the landing is disposed between the door panel and the latch bolt.

14. The door panel arrangement of claim 8, further comprising a handle operably coupled to the latch bolt.

15. The door panel arrangement of claim 8, further comprising a spring configured to bias the latch bolt in a rotational direction about a pivot.

16. The door panel arrangement of claim 8, wherein the contacting member comprises an adjustable threaded stud coupled to the latch bolt.

17. The door panel arrangement of claim 8, wherein a geometry of the counterbore is complimentary to that of the shear pin.

18. The door panel arrangement of claim 8, wherein the latch bolt rotates in a first rotational direction towards the unlocked position and the door panel rotates in a second rotational direction towards an open position.

19. A shear load carrying method, comprising:
rotating a latch bolt about a pivot;
receiving, by a counterbore disposed in a striker plate, a shear pin in response to the latch bolt rotating about the pivot;
contacting, by a contacting surface of the latch bolt, a contacting surface of the striker plate, wherein the shear pin extends from the contacting surface of the latch bolt at a location that the contacting surface of the latch bolt contacts the contacting surface of the striker plate; and
transferring a shear load between the shear pin and the striker plate.

20. The door panel arrangement of claim 8, wherein the first contacting surface surrounds the shear pin.

\* \* \* \* \*